United States Patent [19]
Ficht

[11] Patent Number: 6,161,525
[45] Date of Patent: Dec. 19, 2000

[54] LIQUID GAS ENGINE

[75] Inventor: Reinhold Ficht, Kirchseeon, Germany

[73] Assignee: Ficht GmbH & Co. KG, Kirchseeon, Germany

[21] Appl. No.: 09/248,544

[22] Filed: Feb. 11, 1999

Related U.S. Application Data

[63] Continuation of application No. PCT/EP97/04647, Aug. 26, 1997.

[30] Foreign Application Priority Data

Aug. 30, 1996 [DE] Germany .......................... 196 35 248

[51] Int. Cl.[7] .................................................. F02M 37/04
[52] U.S. Cl. .......................................... 123/495; 123/525
[58] Field of Search ........................... 123/525, 527, 123/495, 497

[56] References Cited

U.S. PATENT DOCUMENTS

| | | | |
|---|---|---|---|
| 4,574,754 | 3/1986 | Rhoades | 123/298 |
| 5,351,893 | 10/1994 | Young | 239/88 |
| 5,469,828 | 11/1995 | Heimberg | 123/497 |
| 5,479,906 | 1/1996 | Collie | 123/525 |
| 5,499,615 | 3/1996 | Lawrence et al. | 123/526 |
| 5,540,206 | 7/1996 | Heimberg | 123/497 |
| 5,690,077 | 11/1997 | Ofner et al. | 123/525 |
| 5,832,906 | 11/1998 | Douviile et al. | 123/527 |
| 5,857,448 | 1/1999 | Ofner et al. | 123/525 |
| 5,868,122 | 2/1999 | Gram et al. | 123/527 |

FOREIGN PATENT DOCUMENTS

| | | | |
|---|---|---|---|
| WO9524551 | 9/1995 | Denmark . | |
| 0320959 | 6/1989 | European Pat. Off. | F02B 12/12 |
| 2275661 | 1/1976 | France | F02P 13/02 |
| 2629516 | 10/1989 | France | F02B 3/08 |
| 4206817 | 4/1993 | Germany | F02M 47/00 |
| 19515781 | 4/1995 | Germany | F02B 17/00 |
| 19611381 | 9/1996 | Germany | F02M 21/02 |

*Primary Examiner*—Thomas N. Moulis
*Attorney, Agent, or Firm*—Fletcher, Yoder & Van Someren

[57] ABSTRACT

A liquid gas engine includes at least one combustion chamber, in which a liquid gas/air mixture is introduced and ignited, the liquid gas engine having an injection device which injects liquid gas via an injection nozzle. The injection nozzle opens into the combustion chamber, so that the liquid gas is injected directly into the combustion chamber.

The direct injection of the liquid gas achieves ideal combustion conditions, particularly since liquid gas evaporating in the combustion chamber induces cooling which is utilized particularly under a high load.

The liquid gas engine is preferably provided with an injection device which is designed as an alternating piston pump and which works on the energy accumulation principle.

31 Claims, 4 Drawing Sheets

LIQUID GAS ENGINE

CROSS-REFERENCE TO RELATED APPLICATIONS

This application is a continuation application of copending International Application Serial No. PCT/EP97/04647, filed Aug. 26, 1997 claiming the benefit of German Patent Application No. 196 35 248.7, filed Aug. 30, 1996.

BACKGROUND OF THE INVENTION

1. Field of the Invention

The invention relates to a liquid gas engine. Liquid gas engines are spark ignition Otto engines which are supplied with liquid gas.

2. Description of the Related Art

The main components of liquid gas, which is a mixture also designated as LPG (Liquefied Petroleum Gas), are propane and butane. It is obtained during the extraction of crude oil and in refinery processes and can be liquefied under pressure. Liquid gas is distinguished by a high octane number (RON>100).

Liquid gas engines differ from gasoline engines in the different mixture preparation which is necessitated by the great tendency of liquid gas to evaporate. Liquid gas is supplied, as a liquid under pressure, to the engine in corresponding delivery lines. In an evaporator, the liquid gas is converted into the gaseous state by the supply of heat. The evaporator is a heat exchanger, to which heated cooling water is supplied in order to heat and evaporate the liquid gas. The evaporator is combined with a pressure regulator, in order to keep the then gaseous liquid gas within a specific pressure range. The liquid gas is then supplied to a gas/air mixer which mixes liquid gas with air. Such a gas/air mixture is known, for example, from DE 33 32 923 C2. The mixer consists of an annular element which supplies liquid gas from outside to a central air stream passing through the annular element and which swirls them together.

The company DAF presented a liquid gas engine for buses under the type designation LT 160 LPG. This liquid gas engine corresponds to a diesel engine which is converted to a liquid gas engine. In contrast to the known liquid gas engines, the engine presented by DAF is equipped with a liquid gas injection system which injects liquid gas into an intake port. This injection system corresponds entirely to those employed at the present time in Otto engines (passenger vehicles). When the liquid gas is being injected into the intake port, the mixture temperature is to be reduced, and higher efficiency established, as a result of the evaporation of the liquid gas. This cooling by evaporation may lead to the icing up of the injection valves in the starting phase and in the case of high air humidity, and, because of this, it is not possible to ensure that the engine will operate at cold outside temperatures. This could be counteracted by mixture preparation with simultaneous heating, as is known from the already conventional liquid gas engines. However, heating an ignitable mixture entails considerable risks.

Known from FR-A-2 629 516 is an internal combustion engine which is intended for the use of a fuel with a higher vapor pressure and significantly lower viscosity than gas oil. The engine works in accordance with the diesel process, and comprises a device for direct injection of the fuel under high pressure into the combustion chambers via passive mechanical injection nozzles, the device having a low-pressure feed pump, which is capable of regulating the pressure of a fuel to a value which suffices for the fuel not to reach the boiling point of 8000, and a high-pressure pump which is arranged in the vicinity of the injection nozzles. The high-pressure pump has a cylinder and a piston with smooth surfaces for relative displacement and sealing, the surfaces being separated from one another by a radial play of the order of magnitude of 1 µm, and the piston having open surface pores which are impregnated with a lubricant which is resistant to friction and the effect of the fuel.

This known injection device is of complicated design and requires a low-pressure feed pump. Moreover, the injection device does not work effectively enough.

The object on which this invention is based is to provide a liquid gas engine which has a simple design and ensures reliable operation along with a high power output.

SUMMARY OF THE INVENTION

The object is achieved by means of a liquid gas engine having the features of claim 1. Advantageous embodiments are specified in the subclaims.

The liquid gas engine according to the invention is an Otto engine with a high pressure injection device which injects liquid gas directly into the combustion chamber. The liquid gas is thereby conveyed as far as the combustion chamber of the engine in the liquid state of aggregation, in which it can be handled simply and safely.

By means of the injection device, the liquid gas is injected directly into the combustion chamber, atomized and evaporated. The transition from the liquid to the gaseous state of aggregation thus takes place only in the combustion chamber. This affords appreciable advantages, since, in each case, only the quantity necessary for an injection operation is injected and the simultaneous compression of the liquid gas/air mixture occurring in the combustion chamber counteracts cooling due to the evaporation of the liquid gas, so that, even during the cold starting phase, icing up of the injection device is prevented and reliable operation is ensured.

Moreover, in the liquid gas engine according to the invention, the very fine atomization of the liquid gas injected at high pressure achieves excellent distribution in the combustion space and the abrupt evaporation of the liquid gas achieves perfect intermixing of the fuel with the air contained in the combustion chamber, so that the combustion mixture burns up in an ideal way after ignition. The advantageous properties of the liquid gas, such as a high net calorific value (≈46.1 MJ/kg) and high knock resistance, are thereby fully utilized, so that, in contrast to known liquid gas engines, no power losses have to be taken into account, as compared with comparable gasoline engines.

BRIEF DESCRIPTION OF THE DRAWINGS

The invention is explained in more detail by way of example with reference to the drawing in which.

DETAILED DESCRIPTION OF THE PREFERRED EMBODIMENTS

The liquid gas engine according to the invention has an injection device 1 which injects liquid gas directly into a combustion chamber 4 of the liquid gas engine via an injection nozzle 2. The combustion chamber is delimited in a way known per se by a cylinder 5, a cylinder head 11 and a piston 12. An injection nozzle 2 and a spark plug 10 are arranged in the cylinder head 11. The injection nozzle 2 is connected to the injection device 1 via a line 72. The injection device is connected to a pressure tank 111 (illustrated diagrammatically in simplified form in FIG. 1) via a liquid gas supply line 113 and a liquid gas return line 92.

Figure 1:
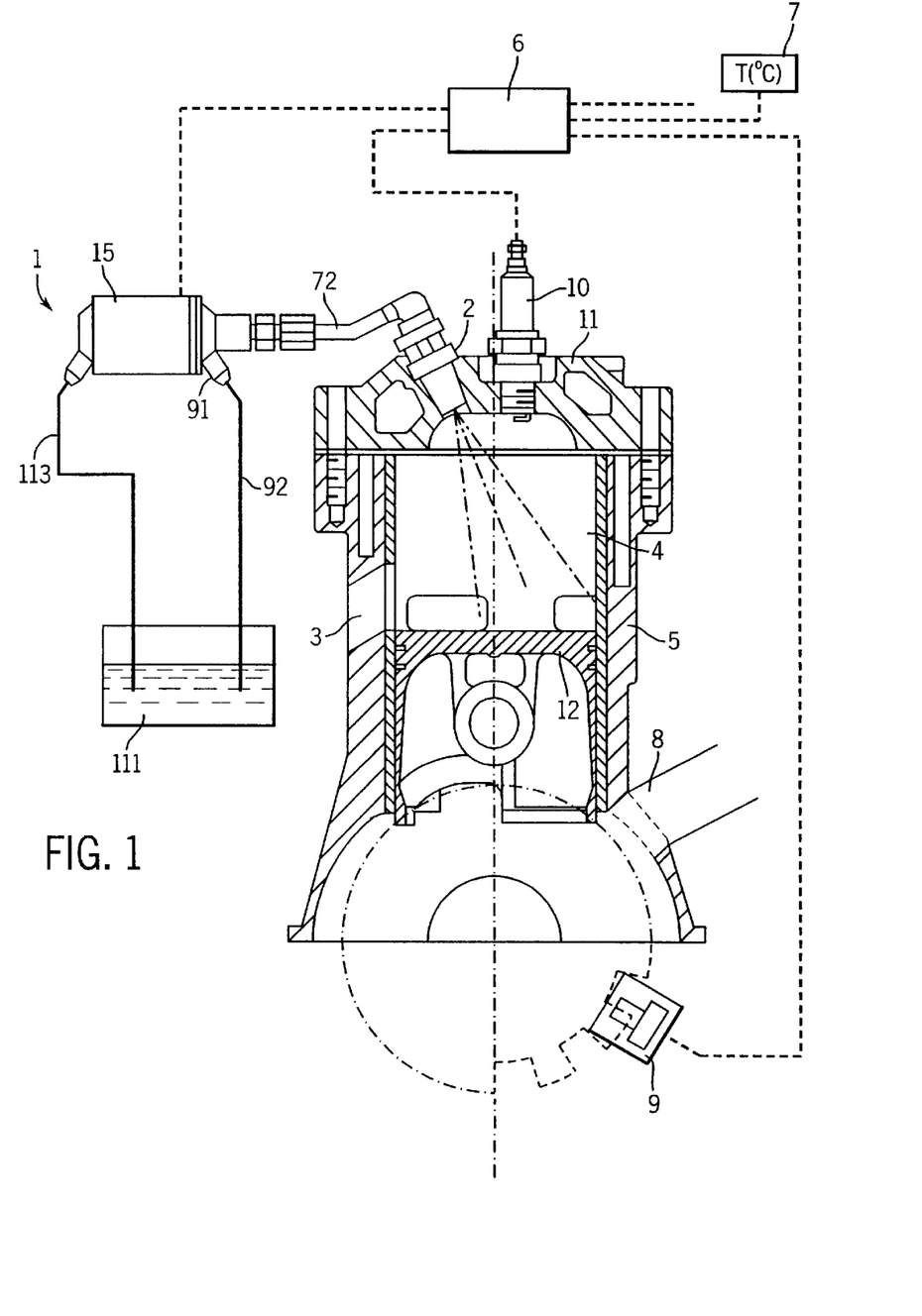
FIG. 1 shows diagrammatically a single-cylinder liquid gas engine with an injection device.

In the liquid gas supply line 113, the liquid gas is kept above the vapor pressure of, for example, 8–12 bar, in order to ensure that it cannot evaporate in the supply line 113. Via the liquid gas discharge line 92, liquid gas not discharged by the injection device 1 is returned into the pressure tank 111. The injection device 1 conveys the liquid gas in short pressure pulses at a pressure of 40 bar, preferably of 60 bar, to the injection device 2, at which the intermittently injected liquid gas is atomized in very fine droplets so as to be distributed over the combustion chamber 4. The droplets evaporate abruptly in the air supplied into the combustion chamber 4 via the inlet port 8. This results in an ideally intermixed fuel/air mixture which can be ignited by means of the spark plug 10. The ignition timing is controlled by an electronic control device 6 in conformity with a plurality of parameters, such as, for example, the outside temperature, the crankshaft position and the injected liquid gas quantity. Due to the high calorific value of the liquid gas, it is expedient for the ignition timing to be retarded somewhat in relation to comparable gasoline engines. The burnt-up exhaust gas is then discharged from combustion chamber 4 via an exhaust gas port 3.

By virtue of the inventive direct injection of liquid gas, the cooling effect generated as a result of the evaporation of the liquid gas occurs in the combustion chamber 4. In the case of a relatively low load, where the injected liquid gas quantity is small, the cooling effect is correspondingly low and is compensated by the compression generated by means of the compression stroke of the piston 12. Under high load, a substantially larger liquid quantity is injected into the combustion chamber 4. The cooling effect is increased correspondingly, so that, in the case of high loads, a marked increase in efficiency is achieved by virtue of the "internal" cooling.

The injection device 1 is preferably designed as an electromagnetically driven alternating piston pump 1 which works on the energy accumulation principle, so that the liquid gas is injected into the combustion chamber 4 in short pressure pulses. Alternating piston pumps 1 of this type are known, for example, from DE-41 06 04 15 A or DE 42 06 817 A.

Figure 2:
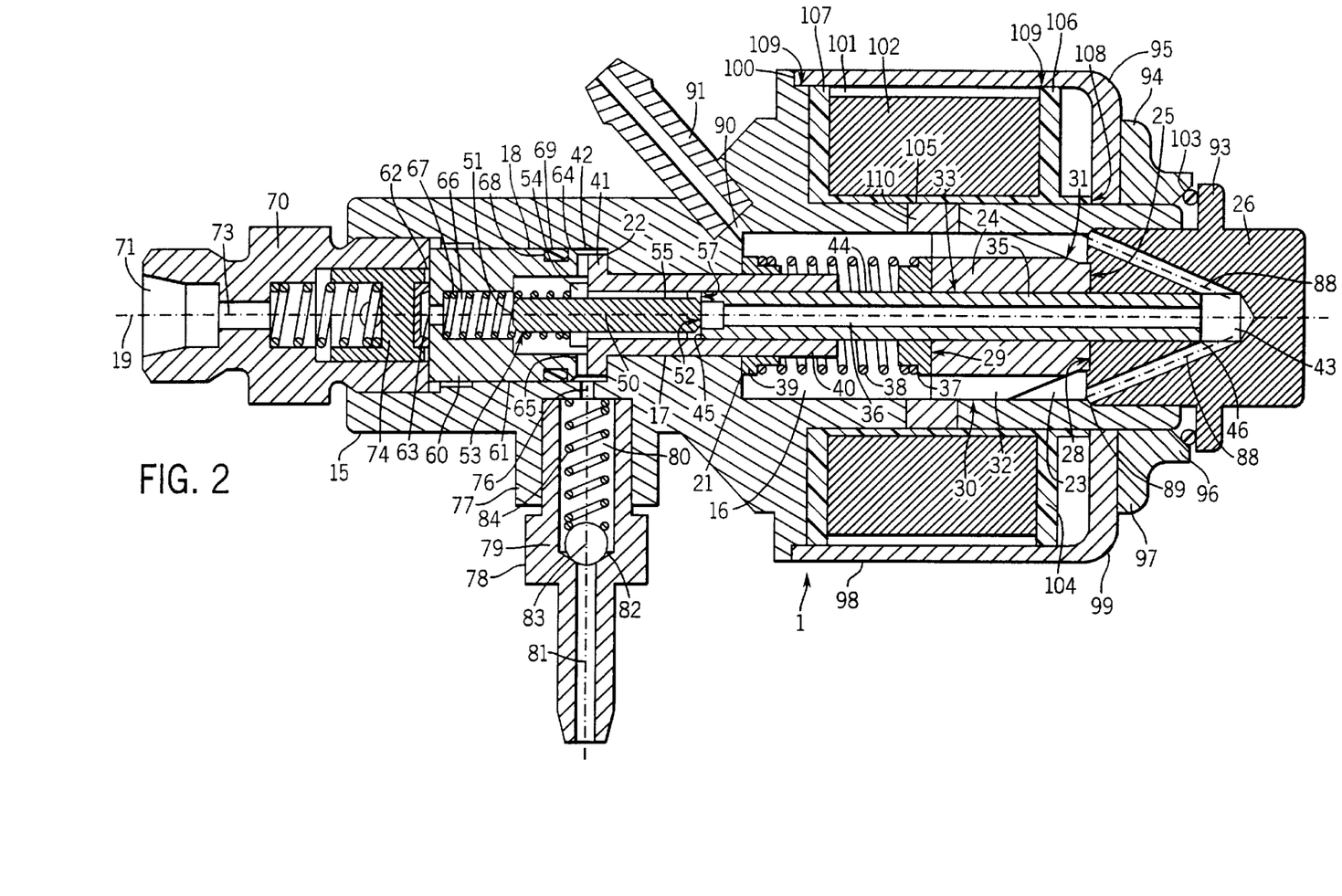
FIG. 2 shows a longitudinal section through the injection device shown in FIG. 1.
Figure 3:
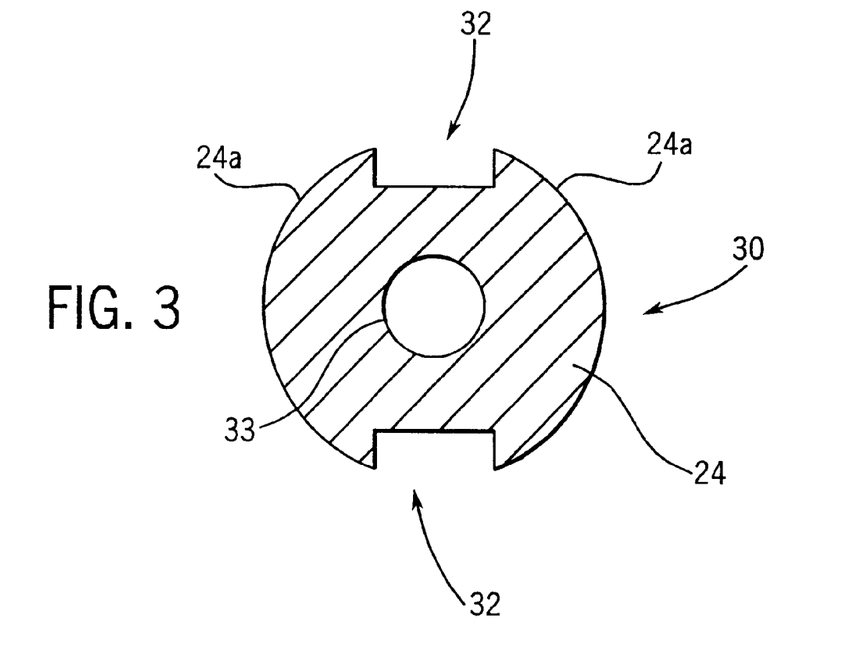
FIG. 3 shows a cross section through an armature of the injection device shown in FIG. 2.
Figure 4:
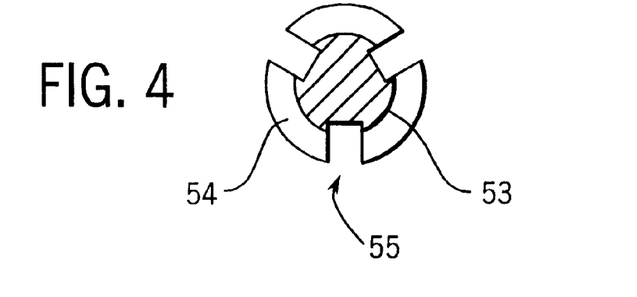
FIG. 4 shows a cross section through a valve body of the injection device shown in FIG. 2.

An exemplary embodiment of the alternating piston pump is shown in FIGS. 2 to 4.

The alternating piston pump 1 has an essentially elongate cylindrical pump casing 5 with an armature bore 16, with a valve bore 17 and with a pressure chamber bore 18 which are in each case made one behind the other in the pump case 15 and form a passage extending through the entire pump casing 15. The armature bore 16 is arranged downstream of the valve bore 17 in the injection direction and the pressure chamber bore 18 is arranged upstream of the valve bore 17 in the injection direction. The bores 16, 17, 18 are arranged concentrically to the longitudinal axis 19 of the pump casing 15, the armature bore 16 and the pressure chamber bore 18 each having a larger inside diameter than the valve bore 17, so that the armature bore 16 and the valve bore 17 are offset relative to one another by means of a first annular step 21 and the valve bore 17 and the pressure chamber bore 18 are offset relative to one another by means of a second annular step 22.

The armature bore 16 delimits, in the radial direction, an armature space 23, in which an approximately cylindrical armature 24 is arranged so as to be movable back and forth in the direction of the longitudinal axis. The armature space is delimited, in the axial direction, forwardly by the first annular step 21 and rearwardly by a front end face 25 of a cylindrical plug 26 which is screwed into that end of the armature bore 16 which is open rearwardly in the injection direction.

The armature 24 is formed from an essentially cylindrical body with end faces 28, 29 located at the front and rear in the injection direction and from an outer surface 30. Material is removed in the region of the armature circumference from the rear end face 28 approximately as far as the longitudinal center of the armature 24, so that the armature 24 has a conical surface 31 running outwardly from the rear forward. The armature 24 is inserted with play between its outer surface 30 and the inner surface of the armature bore 16, so that, when the armature 24 moves back and forth in the armature bore 16, it touches the inner surface of the armature bore 16 solely if the armature 24 tilts, with the result that friction between the armature 24 and the armature bore 16 is kept low. The provision of the conical surface 31 on the armature 24 further reduces the contact surface and, consequently, the frictional surface, with the result that friction between the armature 24 and the inner surface of the armature bore 16 and therefore also the generation of heat are further reduced. The armature 24 is provided, in the region of its outer surface 30, with at least one, preferably two or more grooves 32 running in the direction of the longitudinal axis. The armature 24 has a cross sectional shape (FIG. 3) with two laterally arranged semicircular elements 24a and with two wide shallow grooves 32 in the region between the semicircular elements 24a. A continuous bore 33 is made centrally on the armature 24 in the direction of the longitudinal axis.

A feed piston tube 35 is inserted into the bore 33 of the armature 24 and forms a central passage space 36. Seated on the front end face 29 of the armature 24 is a plastic ring 37, through which the feed piston tube 35 passes. Supported forwardly on the plastic ring 37 is an armature spring 38 which extends as far as a corresponding matching bearing ring 39. This bearing ring 39 is seated on the first annular step 21 in the armature bore 16.

The feed piston tube 35 is connected nonpositively to the armature 24. The unit consisting of the feed piston tube 35 and of the armature 24 is designated below as a feed piston element 44. The feed piston element 44 may also be designed in one part or in one piece.

Seated positively in the valve bore 17 is a guide tube 40 which extends rearwardly into the armature space 23 into the region within the helical spring 38. An outwardly projecting annular web 41, which is supported rearwardly on the second annular step 22, is provided at that end of the guide tube 40 which is at the front in the injection direction. The annular web 41 does not extend radially quite as far as the inner surface of the pressure chamber bore 18, so that a narrow cylindrical gap 42 is formed between the annular web 41 and the pressure chamber bore 18. The guide tube 40 is secured against rearward axial displacement by means of the annular web 41.

The feed piston tube 35 connected nonpositively to the armature 24 extends forwardly into the guide tube 40 and rearwardly into an axial blind bore 43 of the plug 26, so that the feed piston tube 35 is guided both at its end 45 at the front in the injection direction and its rear end 46. By virtue of this bilateral guidance at the ends 45, 46 of the elongate feed piston tube 35, the feed piston element 44 is guided in tiltfree manner, so that undesirable friction between the armature 24 and the inner surface of the armature bore 16 is reliably avoided.

Mounted axially displaceably the front region of the guide tube 40 is a valve body 50 which forms an essentially cylindrical elongate tenonlike solid body with a front and a rear end face 51, 52 and with an outer surface 53. The outside diameter of the valve body 50 corresponds to the clear width of the passage in the guide tube 40. An annular web 54 is provided on the outer surface 53 of the valve body 50 and is arranged approximately at the end of the front third of the valve body 50. The annular web 41 of the guide tube 40 forms an abutment for the annular web 54 of the valve body 50 when the latter is in the position of rest, so that said valve body cannot be displaced further rearwardly. The valve body 50 is provided, on its circumference, with three grooves 55 running in the direction of the longitudinal axis (FIG. 4). The annular web 54 is interrupted in the region of the grooves 55.

The rear end face 52 of the valve body 50 is designed conically on its edge region and cooperates with the end face of the front end 45 of the feed piston tube 35. The spatial shape of the front end 45 of the feed piston tube 35 is adapted to the rear end face 52 of the valve body 50, in which the inner edge of the feed piston tube 35 is chamfered and the wall of the feed piston tube 55 is stripped away somewhat on the inside. The feed piston tube 35 thus forms, with its front end 45, a valve seat 57 for the valve body 50. When the valve body 50 bears with its rear end face 52 on the valve seat 57, passage through the grooves 55 made in the region of the outer surface of the valve body 50 is blocked.

That region of the valve body 50 which projects forwardly from the guide tube 40 to the pressure chamber bore 18 is surrounded by a pressure chamber body 60 which consists of a cylinder wall 51 and of a front end wall 62, a hole or bore 63 being introduced centrally into the end wall 62. The pressure chamber body 60 is positively inserted with its cylindrical wall 61 in the pressure chamber bore 18, and is arranged in such a way that its end face 64, located at the free end of the cylinder wall 61, butts on the outwardly projecting annular web 41 of the guide tube 40, there being provided in the pressure chamber body 60 radial passage bores 65 which make a connection of the pressure chamber 66 to the fuel supply bore 76.

The pressure chamber body 60 delimits, with its interior, a pressure chamber 66, into which the valve body 50 can penetrate and put the fuel located in the pressure chamber 66 under pressure. The pressure chamber has a greater clear width on its region located at the rear in the injection direction, said region extending approximately over half the length of the pressure chamber body 60, than in the front region. The greater clear width in the rear region is dimensioned in such a way that the valve body 50 can penetrate with its annular web 54 into the pressure chamber 66 with slight play, whereas the clear width of the front region is dimensioned in such a way that there is sufficient space only for that region of the valve body 50 which extends forwardly from the annular web 54 and for a helical spring 67 surrounding this region. As a result, the pressure chamber 66 is designed to be only slightly larger than the space taken up by the thrust movement of the valve 50 executed during the injection operation.

The helical spring 67 is located, at one end, on the end wall 62 of the pressure chamber body 60 on the inside and, with its other end, bears on the valve body 50 and, in particular, on the annular web 54 of the latter, so that said spring presses the valve body 50 and the pressure chamber body 60 apart from another.

The pressure chamber body 60 is axially fixed forwardly in the injection direction by means of a connection piece 70 which is screwed into the forwardly open end of the pressure chamber bore 18. The connection piece 70 limits the position of the pressure chamber body 60 forwardly in the axial direction, so that the valve body 50 is prestressed rearwardly by the helical spring 67. The connection piece is designed, on the outside, with a mouth 71 for connecting the fuel feedline 72 (FIG. 1). The connection piece 70 has a bore 73 which is continuous in the direction of the longitudinal axis and in which a static pressure valve 74 is accommodated. The static pressure valve is preferably arranged so as to be adjacent to the pressure chamber body 60.

The pressure chamber body 60 is provided, on its outer surface, with an annular groove 68, in which is seated a plastic sealing ring 69 which seals off the pressure chamber body 60 relative to the inner surface of the pressure chamber bore 18.

For the supply of liquid gas, a liquid gas supply orifice 76 is made on the pump casing 15 in the region of the pressure chamber bore 18, so that said orifice can communicate with the bores 65 in the pressure chamber body 60. On the outside of the pump casing 15, the liquid gas supply orifice 76 is surrounded by a socket 77 for a liquid gas supply valve 78 which is screwed into the socket 77. The liquid gas supply valve 78 is designed as a one-way valve with a valve housing 79. The valve housing 79 has two axially aligned bores 80, 81, the pump casing side bore 80 having a larger inside diameter than the bore 81, so that an annular step is formed between the two bores, said annular step forming a valve seat 82 for a ball 83. The ball 83 is prestressed against the valve seat 82 by a spring 84, which is supported in the bore 80 on the pump casing 15 in the region around the liquid gas supply orifice 76, so that liquid gas supplied under pressure from outside lifts the ball 83 from the valve seat 82, so that the liquid gas is supplied into the pressure chamber bore 18 through the bore 80 and the liquid gas supply orifice 76.

A passage extends from the pressure chamber 66 through the grooves 55 of the valve body 50, the distance between the valve seat 57 of the feed piston tube 35 and the rear end face 52 of the valve body 50 and the passage space 36 of the feed piston tube 35 into the blind hole 43 of the plug 26. The blind hole or blind bore 43 is arranged to run in the direction of the longitudinal axis and opens into the armature space 23, the blind hole 43 extending approximately over two-thirds to three-quarters of the length of the plug 26. One, preferably two or more long bores 88 extend from the rear region of the blind hole 43 to the peripheral region 89 of the front end face 25 of the plug 26, so that a communicating connection is made between the armature space 23 and the blind hole 43.

An outwardly leading bore 90 is introduced as a liquid gas outflow orifice on the peripheral region of the first annular step. The bore 90 is lengthened on the outside by a connecting nipple 91 for connecting the liquid gas return line 92 (FIG. 1).

The cylindrical plug 26 has, on its outer surface, a peripheral annular web 93 projecting outwardly. The annular web 93 also serves, inter alia, for the axial fixing of a locking ring 94 surrounding the pump casing 15 on the outside or of a coil housing cylinder 95 arranged so as to be directly adjacent to the locking ring 94. The locking ring 94 forms, in cross section, two legs 96, 97 arranged at right angles to one another, one leg 96 bearing on the outside of the pump casing 15 and the other leg 97 projecting outwardly and bearing on the coil housing cylinder. The coil housing cylinder 95 consists of a cylinder wall 98 and of a cylinder bottom 99 which is connected laterally to the cylinder wall 98 so as to point inwardly and which has a hole, so that the coil housing cylinder 95 is pushed onto the coil housing 15 from the rear, with the cylinder bottom 99 pointing rearwardly, until the cylinder wall 98 butts on a housing wall 100 projecting perpendicularly outwardly from the coil housing 15 and thus delimits an annular chamber 101 of approximately rectangular cross section for receiving a coil 102.

The coil housing cylinder 95 and the locking ring 94 are thus clamped between the housing wall 100 and the annular web 93 of the plug 26 and fixed in their axial position. The leg 96 of the locking ring 94 is chamfered at the inner edge of its end face, a sealing ring 103, such as, for example, an O-ring, being clamped between the chamfer, formed in said end face, and the annular web 93.

The coil 102 is approximately rectangular in cross section and is cast in a carrying body cylinder 104 of U-shaped cross section by means of epoxide resin, so that the coil 102 and the carrying body cylinder 104 form a one-part coil module. The carrying body cylinder 104 has a cylinder wall 105 and two side walls 106, 107 which project radially from the cylinder wall 105 and delimit the space for the coil 102, the cylinder wall 105 extending laterally beyond the rear side wall 106, so that the end face 108 of the latter, the end face 109 of the side walls 106, 107 and the inner surfaces of the cylinder wall 106 and the front side wall 107 come to bear positively in the annular chamber 101.

A material 110 having low magnetic conductivity, for example copper, aluminum, stainless steel, is introduced in that region of the pump casing 15 which is arranged between the coil 102 and the armature space 23, in order to avoid a magnetic short circuit between the coil 102 and the armature 24.

In this initial position, a liquid gas which is under an admission pressure is supplied from the liquid gas tank 111 by means of the feed pump 112 and the liquid gas supply line 113 through the liquid gas supply valve 78 into the pressure chamber 66. The liquid gas flows from the pressure chamber 66 through the grooves 55 made in the outer surface region of the valve body 50, through the guide tube 40, into the gap between the valve seat 57 of the feed piston tube 35 and the rear end face 52 of the valve body and through the passage space 36 of the feed piston 35 into the blind hole 43 of the plug 26. The liquid gas under pressure flows from the rear end region of the blind hole 43 through the bores 88 of the plug 26 and floods the armature space, the regions of the armature space upstream and downstream of the armature 24 being connected to one another in a communicating manner by means of the grooves 32 made in the armature 24, so that the entire armature space is filled with liquid gas. The liquid gas is led through a liquid gas return line 92 back into the liquid gas tank 111 through the bore 90 and the connecting nipple 91.

Thus, when the feed piston element 44 is in the initial position, there is, for the liquid gas, a flow path extending from the liquid gas supply valve 78 via the pressure space 66, the passage space 36 of the feed piston 35, the blind hole 43 and the bore 88 in the plug 26, the armature space 23 and the bore 90 with the connecting nipple 91, so that liquid gas is continuously supplied and scavenged as a result of the passage, the pressure chamber being supplied and flooded directly from the liquid gas tank 111.

The admission pressure of the liquid gas is higher than the pressure drop occurring in the flow path, so that continuous scavenging of the alternating piston pump 1 is ensured, and is lower than the passage pressure of the static pressure valve 74, so that no liquid gas is conveyed into the combustion chamber 4 when the feed piston element 44 is in the initial position.

When the coil 102 is energized as a result of the application of an electric current, the armature 24 is moved forwardly in the thrust or injection direction by the magnetic field generated thereby. During a prestroke over the length s (corresponding to the distance between the valve seat 57 of the feed piston tube 35 and the rear end face 52 of the valve body 50 in the initial position), the movement of the armature 24 and of the feed piston tube 35 connected nonpositively to the latter is counteracted only by the spring force of the spring 38. The spring force of the spring 38 is designed to be so low that the armature 24 is moved virtually without any resistance, but is nevertheless sufficient for returning the armature 24 into its initial position. The armature 24 "floats" in a pressure space 23 filled with liquid gas, and the liquid gas can flow back and forth randomly in the armature space 23 between the regions upstream and downstream of the armature 24, so that no pressure opposing the armature 24 is built up. The feed piston element 44, consisting of the armature 24 and the feed piston tube 35, is therefore accelerated continuously and stores kinetic energy.

The use of an injection device working on the energy accumulation principle makes it possible to inject liquid gas under high pressure with very short injection pulses. By means of such an injection device, it is also possible to inject the liquid gas with a plurality of injection pulses during one work cycle, in order, for example under high load, to introduce a large quantity of liquid gas into the combustion chamber or in order to bring about charge stratification, during which liquid gas is enriched in the region of the spark plug at the ignition timing point.

Instead of the above described embodiment of the alternating piston pump 1 with a return line 92, such a pump, which can be connected to conventional liquid gas tanks, may also be used without a return line.

Figure 5:
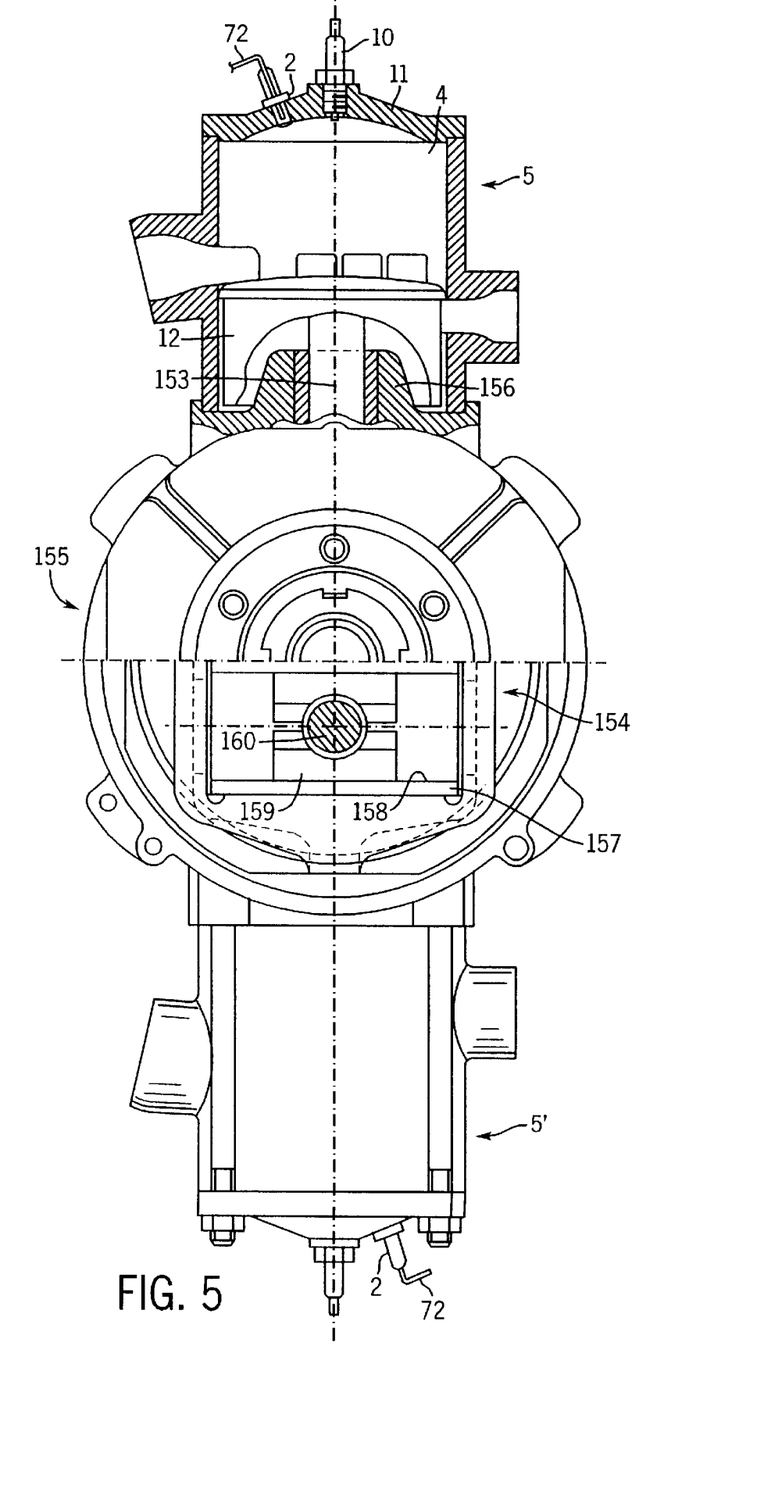
FIG. 5 shows a part section through a slider crank engine.

The liquid gas engine according to the invention is designed as a slider crank engine, preferably in the manner of an opposed cylinder engine. It consists essentially of two mutually opposite coaxially arranged cylinders 5 and 5', in which the working pistons 12 move back and forth rectilinearly. The pistons are connected in each case to their piston rods 153 which likewise execute only rectilinear back and forth movements. The piston rods 153 are articulated at their inner ends on a centrally located peripheral slider crank drive 154 which converts the rectilinear movements of the piston rods into a rotational movement. The slider crank drive is located in a slider crank case 155, to which the cylinders 5 and 5' are fastened via partitions 156. The slider crank drive has a slider crank frame 152 which encloses a rectilinear slotted link 158 arranged transversely to the piston rod 153. A sliding block 159 moves in the slotted link 158, a crank pin 160 of a crankshaft being mounted rotatably in said sliding block. Slider crank engines of this type are known, for example, from DE 29 62 391 A1, DE 32 18 320 A1 and EP 187 930 B1.

These engines may, in the form of a two-stroke engine, simply be provided with separate lubrication, so that the lubricant does not enter the combustion chamber. The combination of direct liquid gas injection with a slider crank engine operated as a two-stroke engine gives an engine with a low weight/power ratio and extremely low pollutant emission.

What is claimed is:

1. A liquid gas engine with at least one combustion chamber, in which a liquid gas/air mixture is introduced and ignited, the liquid gas engine having an injection device which injects liquid gas via an injection nozzle in the form of a direct injection, wherein the injection device includes an alternating piston pump working on an energy accumulation principle, and the injection nozzle opens into the combustion chamber.

2. The liquid gas engine as claimed in claim 1, wherein the injection device is designed as a high pressure injection device which can inject liquid gas at an injection pressure of at least 40 bar, preferably at an injection pressure of about 60 bar.

3. The liquid gas engine as claimed in claim 1, wherein the combustion chamber is delimited by a cylinder, a cylinder head and a piston.

4. The liquid gas engine as claimed in claim 3, wherein the injection nozzle and a spark plug are arranged in the cylinder head.

5. The liquid gas engine as claimed in claim 1, wherein a control device is provided, which is connected to a spark plug, the control device controlling the ignition timing in conformity with a plurality of parameters, such as outside temperature and the crankshaft position.

6. The liquid gas engine as claimed in claim 1, wherein the alternating piston pump is designed with a feed piston element which, during a virtually resistanceless acceleration phase stores kinetic energy which is transmitted abruptly to liquid gas located in a pressure chamber so that a pressure pulse for injecting liquid gas through the injection nozzle is generated, the means which interrupts the resistanceless acceleration phase being a valve which comprises a valve body and a valve seat designed on the feed piston element and which closes the pressure chamber in order to generate the pressure pulse, with the result that the kinetic energy of the feed piston element is transmitted to the fuel enclosed in the pressure chamber, the valve seat and the valve body being arranged at that end of the feed piston element (44) which is located at the front in the injection direction, so that the pressure chamber is designed to be spatially separate from the feed piston element.

7. The liquid gas engine as claimed in claim 6, wherein the pressure chamber is provided with a liquid gas supply orifice for the supply of liquid gas, the liquid gas supply orifice being arranged on a pump casing surrounding the pressure chamber and being connected to the liquid gas supply line, so that fresh liquid gas under pressure is supplied to the pressure chamber.

8. The liquid gas engine as claimed in claim 6, wherein the injection device is designed as an electromagnetically actuated alternating piston pump with a magnet coil and the feed piston element driven by the coil, the feed piston element having a approximately cylindrical armature and an elongate feed piston tube, the ends of the feed piston tube extending beyond the armature in the direction of the longitudinal axis and in each case being mounted in recesses displaceable positively and in the direction of the longitudinal axis.

9. The liquid gas engine as claimed in claim 8, wherein the feed piston tube is connected nonpositively to the armature, the valve seat being arranged at the front end of the feed piston tube.

10. The liquid gas engine as claimed in claim 9, wherein the valve body is an elongate essentially cylindrical solid body which is mounted axially displaceably in a guide tube, the valve body being provided, on its circumference, with the grooves which run in the longitudinal direction and which form a passage from the pressure chamber into a passage space within the feed piston tube, the passage being blocked when the feed piston tube bears with its valve seat on the valve body, with the result that the pressure chamber is closed.

11. The liquid gas engine as claimed in claim 9, wherein the valve body is a ball, a ball seat being provided, which forms an abutment for the boll, so that said ball cannot be displaced further rearwardly, and the ball seat has at least one groove which forms a passage from one of the pressure chambers into a passage space within the feed piston tube, the passage being blocked when the valve seat bears on the valve body, with the result that the pressure chamber is closed.

12. The liquid gas engine as claimed in claim 8, wherein the approximately cylindrical armature has end faces located at the front and rear in the injection direction and an outer surface and has a conical surface running outwardly from the rear forward, approximately as far as the longitudinal center of the armature.

13. The liquid gas engine as claimed in claim 8, wherein the alternating piston pump has a pump casing with an armature bore, in which an armature space is delimited by the armature bore, by a plug rearwardly in the injection direction and by a first annular step forwardly in the injection direction, in said armature space the armature being moved back and forth by means of a magnet coil and a spring loading the armature in the longitudinal direction, the armature being designed, on its outer surface region with at least two grooves running from the circumference in the direction of the longitudinal axis in as symmetric a distribution as possible.

14. The liquid gas engine as claimed in claim 13, wherein the armature assumes an initial state as a result of the spring effect of the spring, when the coil is made currentless, and, in this initial state, a continuous flow path for liquid gas under pressure, which is supplied, is formed by the pressure chamber through the grooves of the valve body and the passage space of the feed body and through a blind hole or one or more bores in the plug.

15. The liquid gas engine as claimed in claim 14, wherein the armature space is connected to the liquid gas discharge line via an outwardly leading bore and a connecting nipple.

16. The liquid gas engine as claimed in claim 13, wherein the plug is provided with a continuous bore, by means of which liquid gas is discharged from the injection device into the liquid gas discharge line.

17. The liquid gas engine as claimed in claim 16, wherein a transverse flow bore is provided. Through which liquid gas can be supplied directly in the armature space, and the plug has bores which connect the armature space to a continuous bore of the plug, so as to form, for scavenging the armature space, a transverse flow path which is independent of a passage space in the feed piston element.

18. The liquid gas engine as claimed in claim 7, wherein the pressure chamber is delimited by a static pressure valve which opens from a predetermined pressure and which frees passage into a fuel feed line to the injection nozzle.

19. The liquid gas engine as claimed in claim 6, wherein the pressure chamber is only slightly larger than the space taken up by the thrust movement of the valve body executed during the injection operation.

20. The liquid gas engine as claimed in claim 1, wherein the liquid gas engine is designed as a two-stroke engine.

21. The liquid gas engine as claimed in claim 1, wherein the liquid gas engine is designed as a slider crank engine.

22. A method for operating a liquid gas engine, the liquid gas engine having combustion chamber, wherein liquid gas is intermittently injected directly into the combustion chamber by means of an injection device having an alternating piston pump working on the energy accumulation principle.

23. The method as claimed in claim 22, wherein the liquid gas is injected under a high pressure of at least 40 bar, preferably 60 bar.

24. The method as claimed in claim 22, wherein a liquid gas/air mixture is simultaneously compressed during injection so that cooling is counteracted by evaporation of the liquid gas.

25. A liquid gas combustion engine comprising:
  at least one combustion chamber wherein a liquid gaseous fuel is introduced and ignited;
  an injection device in communication with the combustion chamber, the injection device including a pressure chamber and a reciprocating assembly in communication with the pressure chamber, wherein the reciprocating assembly has an acceleration phase during which acceleration phase the reciprocating assembly builds kinetic energy which is transmitted abruptly to liquid gaseous fuel located in the pressure chamber and wherein the abrupt transmission of energy creates a pressure pulse for injecting the liquid gaseous fuel through an injection nozzle into the combustion chamber.

26. The liquid gas engine of claim 25, wherein the reciprocating assembly includes an armature and a coil, wherein the acceleration phase is initiated upon an energization of the coil, the energization of the coil inducing a motion in the armature.

27. The liquid gas engine of claim 25, wherein the injection device further comprises a static pressure valve in communication with the pressure chamber, and wherein the static pressure valve actuates in response to the pressure pulse.

28. An injection device for delivery of liquid gaseous fuel comprising:
  a pressure chamber;
  an injection nozzle; and
  a reciprocating assembly in communication with the pressure chamber, the reciprocating assembly having an acceleration phase during which the reciprocating assembly builds kinetic energy and abruptly transmits the energy to liquid gaseous fuel in the pressure chamber wherein the abrupt transmission of energy creates a pressure pulse for injecting the liquid gaseous fuel through the injection nozzle.

29. The injection device of claim 28 wherein the reciprocating assembly includes an armature and a coil, wherein the acceleration phase is initiated upon an energization of the coil, the energization of the coil inducing a motion in the armature.

30. The injection device of claim 28 further comprising a static pressure valve in communication with the pressure chamber, wherein the static pressure valve actuates in response to the pressure pulse.

31. A method of injecting liquid gaseous fuel into the combustion chamber of an internal combustion engine, comprising:
  providing a pressure chamber;
  filling the pressure chamber with liquid fuel;
  providing a reciprocating assembly for communication with the pressure chamber;
  initiating an acceleration phase in the reciprocating assembly;
  building kinetic energy in the reciprocating assembly;
  abruptly transmitting the kinetic energy into the liquid fuel located in the pressure chamber;
  creating a pressure pulse from the abrupt transfer of energy; and
  injecting the gaseous fuel through a nozzle into the combustion chamber.

* * * * *